(12) United States Patent
Nakamura

(10) Patent No.: US 8,379,161 B2
(45) Date of Patent: Feb. 19, 2013

(54) LIQUID CRYSTAL DISPLAY DEVICE

(75) Inventor: Yayoi Nakamura, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 805 days.

(21) Appl. No.: 12/500,278

(22) Filed: Jul. 9, 2009

(65) Prior Publication Data

US 2010/0007810 A1    Jan. 14, 2010

(30) Foreign Application Priority Data

Jul. 14, 2008  (JP) ................................. 2008-183219

(51) Int. Cl.
*G02F 1/1343* (2006.01)
(52) U.S. Cl. ........................................... 349/38; 349/48
(58) Field of Classification Search ................... 349/38, 349/39, 43, 48, 34, 33, 139, 143; 345/87, 345/89, 90, 92, 93
See application file for complete search history.

(56) References Cited

U.S. PATENT DOCUMENTS

| | | | | |
|---|---|---|---|---|
| 7,755,710 | B2 * | 7/2010 | Wang et al. ..................... | 349/48 |
| 2004/0001167 | A1 | 1/2004 | Takeuchi et al. | |
| 2006/0097972 | A1 | 5/2006 | Takeuchi et al. | |
| 2006/0215066 | A1 | 9/2006 | Ueda et al. | |
| 2007/0146608 | A1 | 6/2007 | Jin et al. | |
| 2008/0024689 | A1 | 1/2008 | Ahn | |
| 2008/0094339 | A1 | 4/2008 | Lin et al. | |
| 2008/0158452 | A1 | 7/2008 | Wu | |
| 2008/0158455 | A1 * | 7/2008 | Yoo et al. ........................ | 349/38 |
| 2008/0258452 | A1 | 10/2008 | Yoshida | |
| 2009/0009449 | A1 | 1/2009 | Uchida et al. | |
| 2009/0195487 | A1 | 8/2009 | Shimoshikiryoh et al. | |
| 2009/0244419 | A1 | 10/2009 | Nakamura et al. | |
| 2010/0053052 | A1 | 3/2010 | Shimoshikiryoh | |

FOREIGN PATENT DOCUMENTS

| | | |
|---|---|---|
| EP | 2051136 A1 | 4/2009 |
| JP | H7-28091 A | 1/1995 |
| JP | H7-72509 A | 3/1995 |

(Continued)

OTHER PUBLICATIONS

Pending U.S. Appl. No. 12/407,771, filed Mar. 19, 2009. (corresponding U.S. Patent Application Publication No. 20090244419) The Office Action dated Nov. 8, 2011, reject the claims under double patenting based upon the instant application.
Japanese Office Action dated Mar. 16, 2010, in a counterpart application JP2008-094421 of the related U.S. Appl. No. 12/407,771.

(Continued)

*Primary Examiner* — Thoi Duong
(74) *Attorney, Agent, or Firm* — Chen Yoshimura LLP

(57) ABSTRACT

A liquid crystal display device with multiple pixels includes a first sub-pixel including, a first liquid crystal capacitance between a common electrode and a first pixel electrode, and a first auxiliary capacitance between the first pixel electrode and a first auxiliary capacitance electrode; a second sub-pixel disposed including, a second liquid crystal capacitance between the common electrode and a second pixel electrode, a second auxiliary capacitance between the second pixel electrode and a second auxiliary capacitance electrode, and a step-up capacitance between the second pixel electrode and a step-up capacitance electrode; a first voltage application unit for applying a common first voltage to the common electrode, the first auxiliary capacitance electrode, and the second auxiliary capacitance electrode; and a second voltage application unit for applying a second voltage, which is different from the first voltage, to the step-up capacitance electrode.

20 Claims, 15 Drawing Sheets

FOREIGN PATENT DOCUMENTS

| | | |
|---|---|---|
| JP | H7-152013 A | 6/1995 |
| JP | H8-15723 A | 1/1996 |
| JP | 2004-078157 A | 3/2004 |
| JP | 2006-133577 A | 5/2006 |
| JP | 2007-156379 A | 6/2007 |
| JP | 2008-033218 A | 2/2008 |
| JP | 2009-244818 A | 10/2009 |
| WO | 2007/091365 A1 | 8/2007 |
| WO | 2008/018552 A1 | 2/2008 |
| WO | 2008/023601 A1 | 2/2008 |

OTHER PUBLICATIONS

Japanese Office Action (Notification of Reason for Refusal) in counterpart application JP2008-183219, dated Apr. 20, 2010, citing Foreign Patent document No. 1 listed above, JP2008-033218, JP2007-156379 and JP2004-078157 which have been submitted in previous IDS. Partial translation of the Office Action is attached as a concise explanation of relevance.

Japanese Office Action (Decision of Refusal) in counterpart application JP2008-183219, dated Aug. 31, 2010.

\* cited by examiner

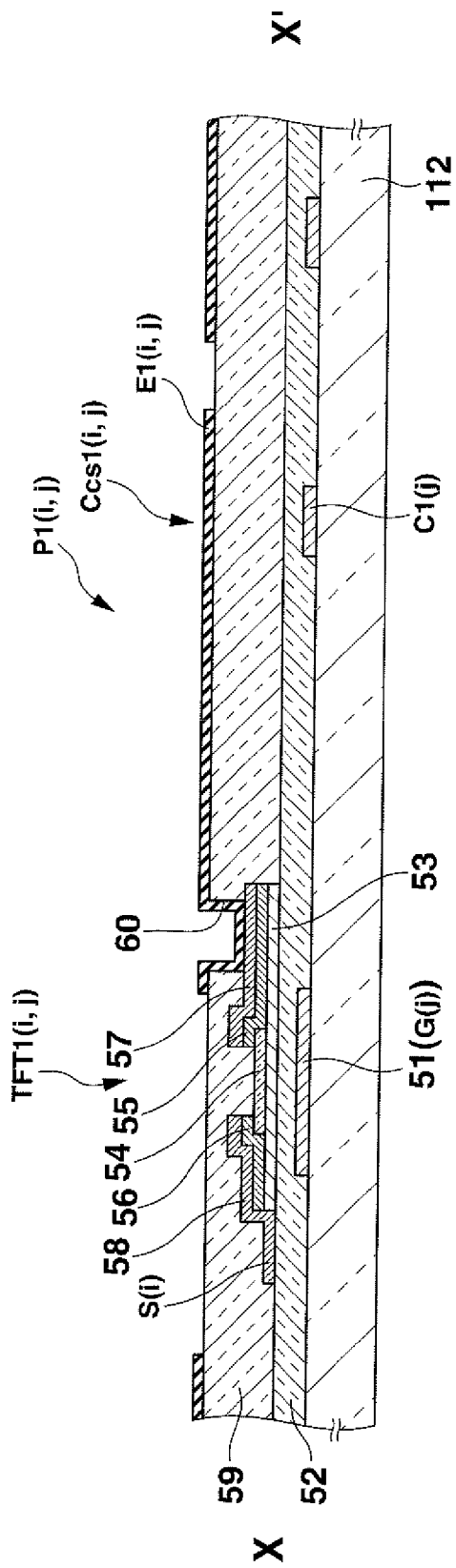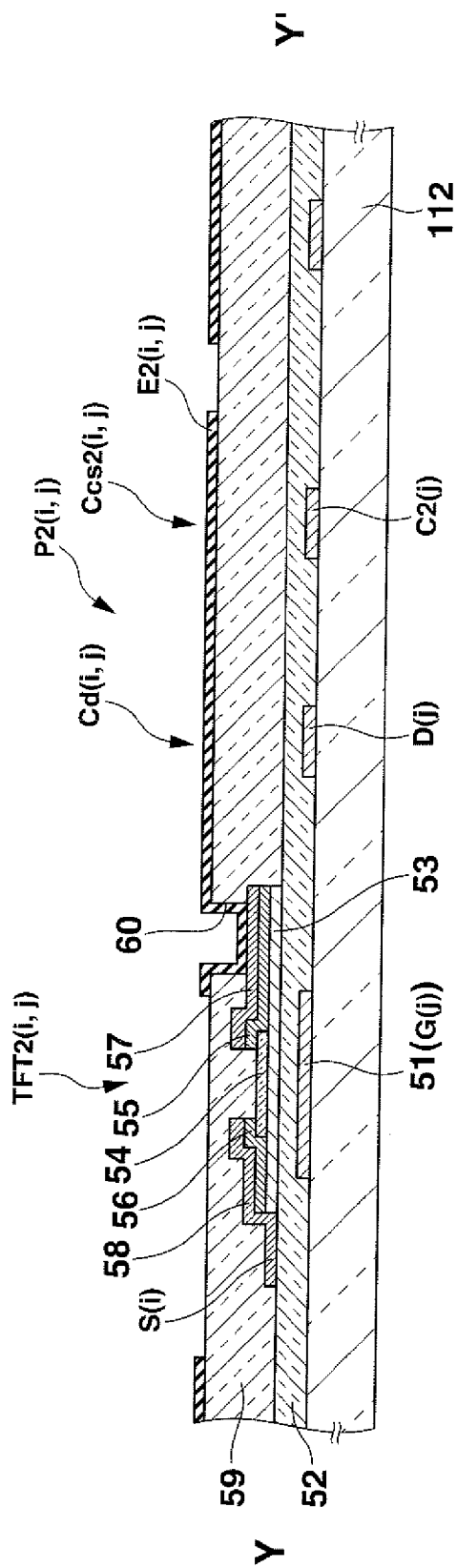

LIQUID CRYSTAL DISPLAY DEVICE

This application is based upon and claims the benefit of priority from the prior Japanese Patent Application No. 2008-183219, filed Jul. 14, 2008, the entire contents of which are incorporated herein by reference.

BACKGROUND OF THE INVENTION

1. Field of the Invention

The present invention relates to a liquid crystal display device having pixels equipped with first sub-pixels and second sub-pixels whose pixel electrodes are separated from each other.

2. Description of the Related Art

With conventional liquid crystal display devices, a voltage is applied to a liquid crystal through switching devices such as thin film transistors (TFT) and others disposed in pixels.

FIG. 19 is a view schematically showing a pixel 300 of a conventional liquid crystal display device. A pixel electrode (Pix) 301 is charged to a source potential via a transistor 302. A common voltage (Vcom) is applied to a common electrode (COM) 303, and the potential difference between the common electrode 303 and the pixel electrode 301 is applied to the liquid crystal as a voltage (Vlc). In this case, the liquid crystal sandwiched by the common electrode 303 and the pixel electrode 301 forms a liquid crystal capacitance Clc, whereas a solid dielectric material sandwiched by the pixel electrode 301 and an auxiliary capacitance line 305 forms an auxiliary capacitance Ccs.

Fig The auxiliary capacitance Ccs is formed in parallel with the liquid crystal capacitance Clc. At the same time, since the auxiliary capacitance line 305 is connected in a way that allows the same potential as the common electrode 303 to be applied, the potential fluctuation that occur at the pixel electrode 301 due to a gate potential fluctuation or the leak current at off state of the transistor 302 is reduced. To prevent an image burn-in and electrolysis of the liquid crystal, the liquid crystal display device is ac-driven that the polarity of the voltage is applied to the liquid crystal to be switched at specified intervals.

There is a well-known technique, for example, that a pixel of a liquid crystal device is divided into multiple regions and different voltages are applied to each region to decrease the dependence of display status on viewing angles, as disclosed by Japanese Patent Laid Open Applications, JP H7-028091A (1995) and JP H8-015723A (1996).

Specifically, JP H7-028091A discloses a liquid crystal display device that a TFT is connected to any one of the divided pixel electrodes, and effective voltages at various levels are applied to multiple regions within the pixels of the liquid crystal by applying the voltage to the pixel electrode connected to the TFT to other pixel electrodes via a capacitance formed between the relevant pixel electrode.

JP H8-015723A discloses an active matrix liquid crystal display that its common electrode is disposed opposite to a pixel electrode connected to a TFT and is divided into multiple regions. By applying different voltages to each region, effective voltages at various levels are applied to the liquid crystal of a plural region in a pixel.

However, in the liquid crystal display device disclosed by JP H7-028091A, if the capacitances formed between the pixel electrode connected to the TFT and other pixel electrodes vary due to the difference in thickness of dielectric material (insulation film) for example, a problem arises that the viewing-angle dependences vary among plural liquid crystal display device from device.

On the other hand, in the active matrix liquid crystal display disclosed by JP H8-015723A, since electrode patterning on the pixel size level must be performed on both substrates constituting a liquid crystal panel, it increases the number of manufacturing processes. Furthermore, since high laminating accuracy is required in laminating two substrates, thus inducing a problem that the yielding was lowered.

SUMMARY OF THE INVENTION

Accordingly, an object of the present invention is directed to provide a liquid crystal display device whose viewing-angle dependence, which varies from device to device, can be corrected easily without increasing the number of manufacturing processes, and even after liquid crystal panels have been manufactured, thus solving the problems of conventional liquid crystal display devices.

One of the preferable embodiments of the present invention provides a liquid crystal display device with multiple pixels provided therein, comprising: a first sub-pixel provided for each of said pixels and including, a first liquid crystal capacitance formed with a liquid crystal sandwiched between a common electrode and a first pixel electrode, and a first auxiliary capacitance formed with a solid dielectric material sandwiched between said first pixel electrode and a first auxiliary capacitance electrode; a second sub-pixel disposed adjacent to said first sub-pixel for each of said pixels and including, a second liquid crystal capacitance formed with a liquid crystal sandwiched between said common electrode and a second pixel electrode, a second auxiliary capacitance formed with a solid dielectric material sandwiched between said second pixel electrode and a second auxiliary capacitance electrode, and a step-up capacitance formed with a solid dielectric material sandwiched between said second pixel electrode and a step-up capacitance electrode; a first voltage application means for applying a common first voltage to said common electrode, said first auxiliary capacitance electrode, and said second auxiliary capacitance electrode; and a second voltage application means for applying a second voltage, which is different from said first voltage, to said step-up capacitance electrode.

In another aspect, the present invention provides a liquid crystal display device with multiple pixels provided therein, comprising: a first sub-pixel disposed for each of said pixel and including, a first pixel electrode disposed opposite to a common electrode via a liquid crystal layer, and a first auxiliary capacitance electrode disposed opposite to the first pixel electrode via an insulating layer; a second sub-pixel disposed adjacent to said first sub-pixel for each of said pixels and including, a second pixel electrode disposed opposite to said common electrode via a liquid crystal layer, a second auxiliary capacitance electrode disposed opposite to said second pixel electrode, and a step-up capacitance electrode, a first voltage application means for applying a common first voltage to said common electrode, said first auxiliary capacitance electrode, and said second auxiliary capacitance electrode; and a second voltage application means for applying a second voltage, which is different from said first voltage, to said step-up capacitance electrode.

According to the present invention, the viewing-angle dependence, which varies from device to device, can be corrected easily without increasing the number of manufacturing processes of a liquid crystal display device, and even after liquid crystal panels have been manufactured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

In the drawings:

FIG. 5A is a cross-sectional view of the pixel in FIG. 4 taken along a line X-X';

FIG. 5B is a cross-sectional view of the pixel in FIG. 4 taken along a line Y-Y';

DETAILED DESCRIPTION OF THE PREFERRED EMBODIMENTS

Figure 1:
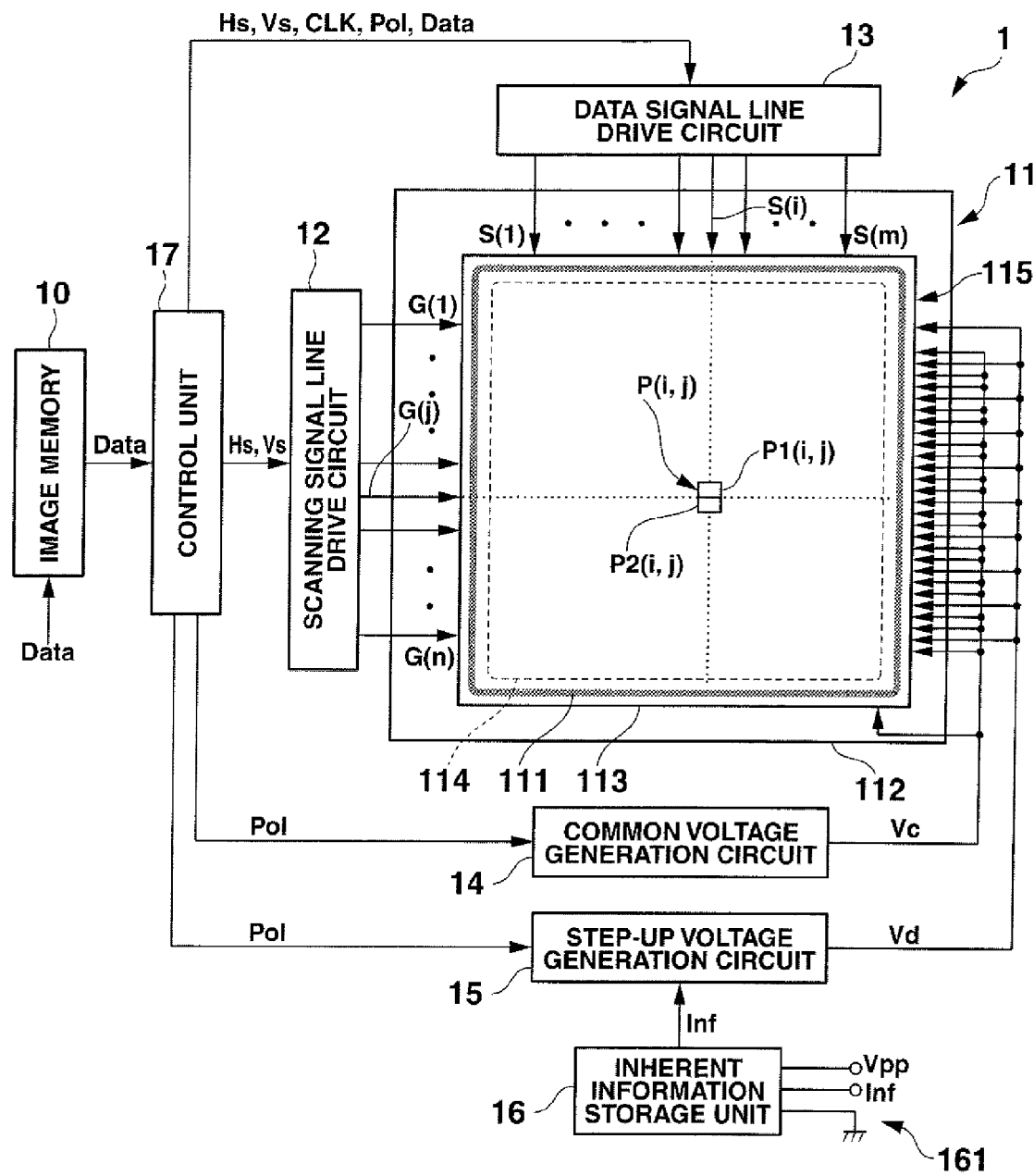
FIG. 1 is a block diagram illustrating a structure of a liquid crystal display device according to an embodiment of the present invention.

Hereinafter, various embodiments of the present invention will be described in detail with reference to the figures in which like reference characters are used to designate like or corresponding components.

As shown in FIG. 1, a liquid crystal display device 1 according to the present invention comprises, for example, an image memory 10 for temporarily storing image data input from outside, a display panel 11 for displaying an image based on the image data stored in the image memory 10, a scanning signal line drive circuit 12 for scanning signal lines of the display panel 11, a data signal line drive circuit 13 for providing a display signal voltage to the data signal lines of the display panel 11 based on an image data, a common voltage generation circuit 14 for applying a specified voltage to a common electrode and auxiliary capacitance lines of the display panel 11, a step-up voltage generation circuit 15 for applying voltage for increasing pixel voltage to step-up capacitance lines of the display panel 11, an inherent information storage unit 16 in which a value of the voltage to be applied by the step-up voltage generation circuit 15 has been stored, and a control unit 17 that outputs various control signals to synchronize each drive unit, whose operation will be described in detail later.

Figure 2:
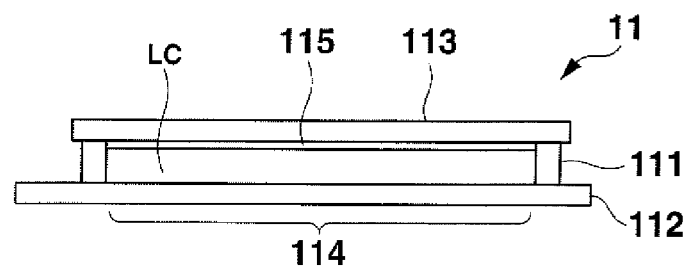
FIG. 2 is a drawing illustrating a cross-sectional area of a liquid crystal display device according to an embodiment of the present invention.
Figure 3:
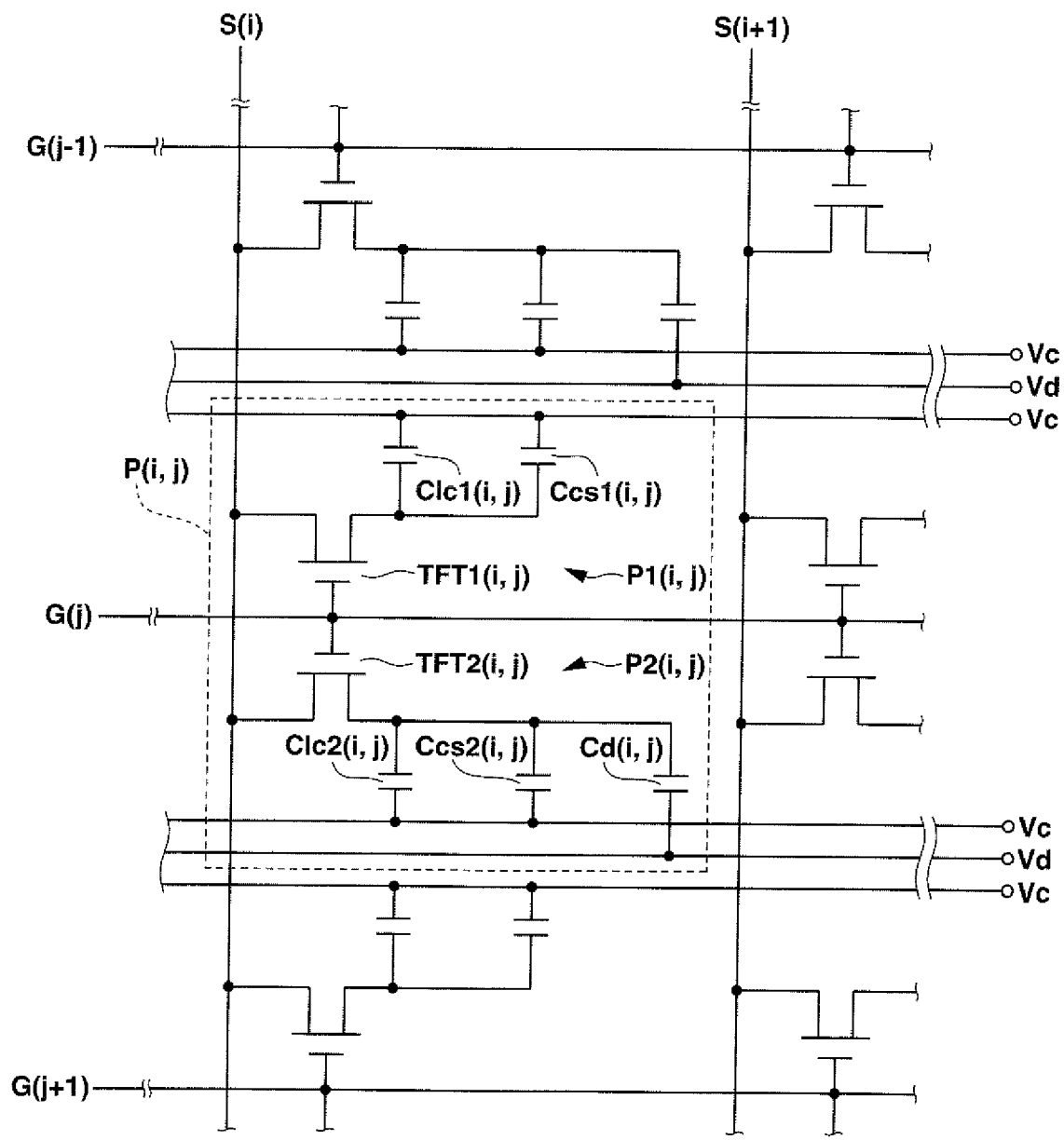
FIG. 3 is a drawing illustrating an equivalent circuit of a pixel.
Figure 4:
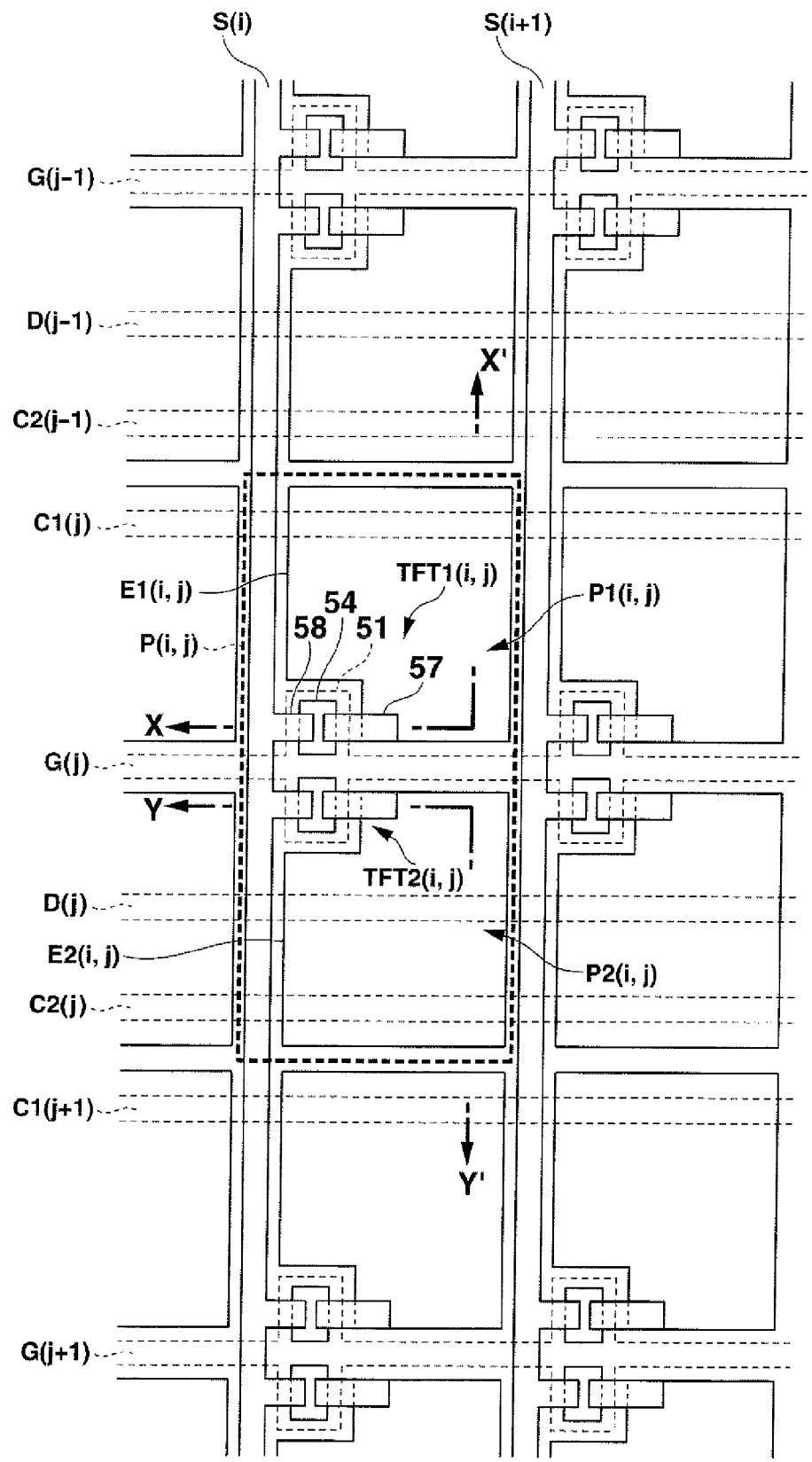
FIG. 4 is a magnified plan view of a pixel.

As shown in FIG. 2, the display panel 11 is comprised of a pair of substrates 112 and 113 which are disposed opposite to each other and adhered with a sealing agent 111, and a liquid crystal LC is sandwiched between the substrates 112 and 113. One of the substrates 112 comprises multiple scanning signal lines extending in the horizontal direction ("n" scanning signal lines, for example), multiple auxiliary capacitance lines also extending in the horizontal direction ("n×2" auxiliary capacitance lines, for example), multiple step-up capacitance lines also extending in the horizontal direction ("n" step-up capacitance lines, for example), and multiple data signal lines extending in the vertical direction ("m" data signal lines, for example) and a pixel P (i, j) as shown in FIGS. 3 and 4 is disposed on the substrate 112 adjacent at each intersections of a scanning signal line G (j) and a data signal line S (i) (i=1, 2, 3, ..., m, and j=1, 2, 3, ... n). A common electrode 115 having a common electric potential at each pixel P (i, j) is disposed on the other substrate 113 that faces substrate 112. For example, a transparent electrode is disposed on a surface of the substrate 113 opposing to substrate 112 to cover the entire surface.

At each pixel P (i, j), a first sub-pixel P1 (i, j) and a second sub-pixel P2 (i, j) are disposed.

At the first sub-pixel P1 (i, j), a first pixel electrode E1 (i, j) and a TFT1 (i, j) as a first switching device, etc. are disposed. The first pixel electrode E1 (i, j) is connected to a drain electrode of TFT1 (i, j), the data signal line S (i) is connected to a source electrode of TFT1 (i, j), and a scanning signal line G (j) is connected to a gate electrode of TFT1 (i, j). A first liquid crystal capacitance Clc1 (i, j) is formed by the common electrode 115, the first pixel electrode E1 (i, j), and the liquid crystal filled between them. An auxiliary capacitance line C1 (j) is disposed on the lower side of the first pixel electrode E1 (i, j) via a solid dielectric material so that a first auxiliary capacitance Ccs1 (i, j) is formed by the first pixel electrode E1 (i, j), the dielectric material, and the auxiliary capacitance line C1 (j).

Meanwhile, in the second sub-pixel P2 (i, j), a second pixel electrode E2 (i, j) separated from the first pixel electrode E1 (i, j), TFT2 (i, j) as a second switching device etc. are disposed. The second pixel electrode E2 (i, j) is connected to a drain electrode of TFT2 (i, j), the data signal line S (i) is connected to the source electrode of TFT2 (i, j), and the scanning signal line G (j) is connected to a gate electrode of TFT2 (i, j). A second liquid crystal capacitance Clc2 (i, j) is formed by the common electrode 115, the second pixel electrode E2 (i, j), and the liquid crystal filled between them. An auxiliary capacitance line C2 (j) and a step-up capacitance line D (j) are disposed on the lower side of the second pixel electrode E2 (i, j) via a solid dielectric material. A second auxiliary capacitance Ccs2 (i, j) is formed by the second pixel electrode E2 (i, j), the dielectric material, and the auxiliary capacitance line C2 (j). Also, a step-up capacitance Cd (i, j) is formed by the second pixel electrode E2 (i, j), the dielectric material, and the step-up capacitance line D (j).

Each pixel P (i, j) is configured to allow display status to be controlled by changing the orientation of the liquid crystal disposed between the pixel electrode and the common electrode 115 of each sub-pixel, P1 (i, j) and P2 (i, j), based on the potential difference between the pixel electrode and the common electrode 115.

The common electrode 115 and the auxiliary capacitance lines C1 (j) and C2 (j) are electrically connected outside the display area 114, which allows an applying a common voltage Vc. A step-up voltage Vd, which is different from the common voltage Vc, is applied to the step-up capacitance lines D (j).

Hereinafter, specific configuration of the cross-sectional area of each pixel P (i, j) will be described by referring to FIGS. 6A and 6B.

The scanning signal line G (j) including a gate electrode 51 is disposed on one of the substrates 112. The auxiliary capacitance lines C1 (j) and C2 (j) and step-up capacitance line D (j) are disposed on the same layer as the scanning signal line G (j). In other words, the scanning signal line G (j), auxiliary capacitance lines C1 (j) and C2 (j), and step-up capacitance line D (j) are formed at a same time. A gate insulating film 52 is disposed on the whole surfaces of these lines. An intrinsic amorphous silicon semiconducting thin film 53 is disposed on the gate insulating film 52. A channel protective film 54 is disposed on the upper surface of approximately center of semiconducting thin film 53. An n-type amorphous silicon contact layers 55 and 56 are disposed on both sides of the channel protective film 54 and the semiconducting film 53 covering the upper face of the channel protective film 54 on both sides.

A drain electrode 57 is disposed on an upper face of one of the contact layers 55. The data signal line S (i) including a source electrode 58 is disposed on an upper face of the other contact layer 56 and an upper face of the gate insulating film 52.

Thus, the TFT1 (i, j) is configured with the gate electrode 51, the gate insulating film 52, the semiconducting thin film 53, the channel protective film 54, the contact layers 55 and 56, the drain electrode 57, and the source electrode 58. TFT2 (i, j) is configured in the same way as the TFT1 (i, j).

A planarizing film 59 made of an insulating material is disposed over the entire surface of the gate insulating film 52 including TFT1 (i, j), TFT2 (i, j), etc. A contact hole 60 is formed in the specified portion of the planarizing film 59 corresponding to the drain electrode 57. The pixel electrodes E1 (i, j) and E2 (i, j) both of which are consisting of ITO are disposed on the specified portions of the planarizing film 59. The pixel electrodes E1 (i, j) and E2 (i, j) are connected to the drain electrodes 57 of the relevant TFT via the contact hole 60.

A portion of the auxiliary capacitance line C1 (j) that overlaps with the first pixel electrode E1 (i, j) serves as an auxiliary capacitance electrode. This overlapping portion forms the first auxiliary capacitance Ccs1 (i, j) as described previously. Meanwhile, a portion of the auxiliary capacitance line C2 (j) that overlaps with the second pixel electrode E2 (i, j) serves as an auxiliary capacitance electrode. As described previously, this overlapping area forms the second auxiliary capacitance Ccs2 (i, j). Furthermore, a portion of the step-up capacitance line D (j) that overlaps with the second pixel electrode E2 (i, j) serves as a step-up capacitance electrode. This overlapping portion forms a step-up capacitance Cd (i, j) as described previously. Each pixel P (i, j) is configured to ensure that a size of the first auxiliary capacitance Ccs1 (i, j) is equal to that of the second auxiliary capacitance Ccs2 (i, j).

Figure 6:
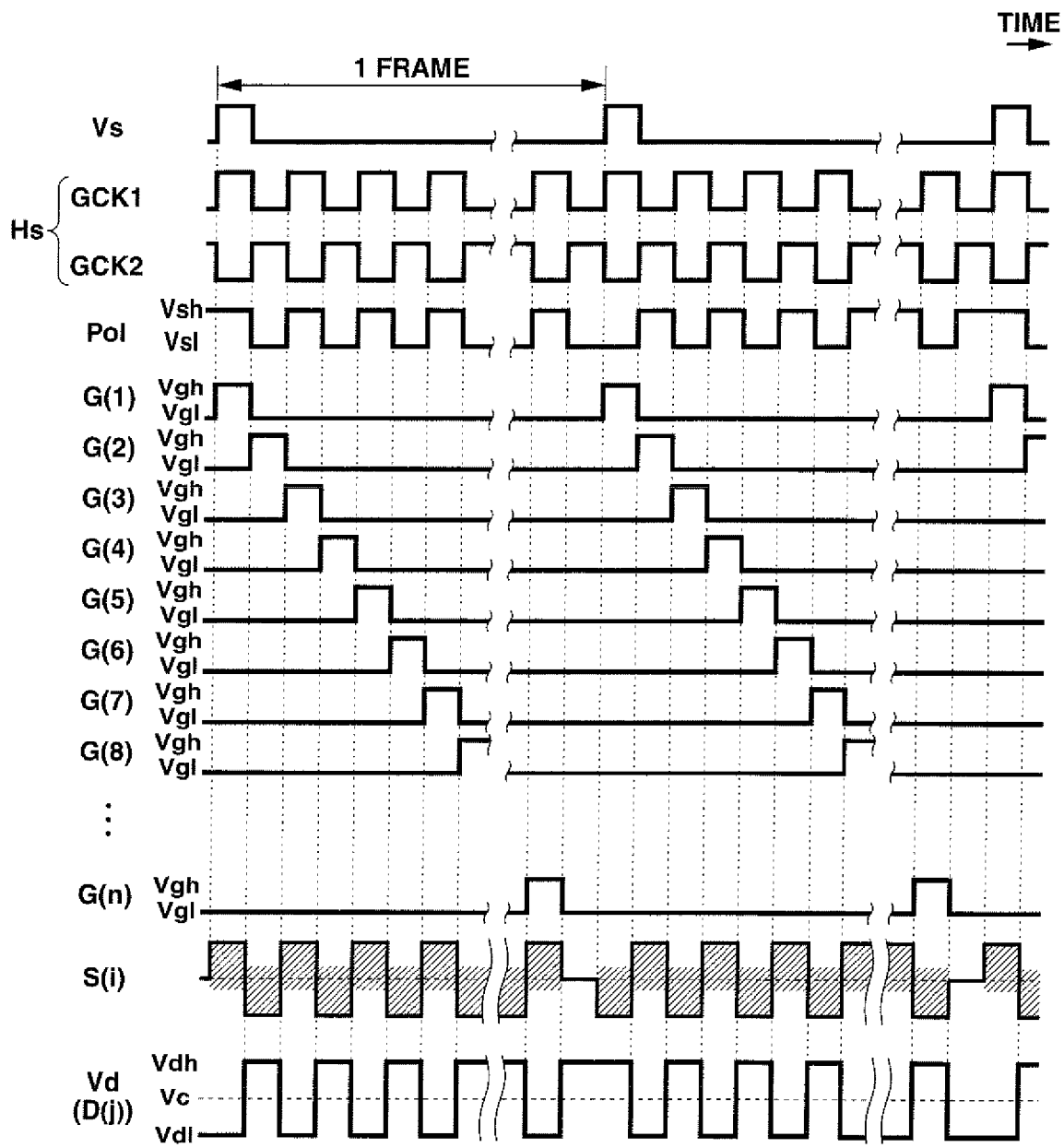
FIG. 6 is a chart illustrating scanning signals and a common voltage.

As shown in FIG. 6, the scanning signal line drive circuit 12 outputs scanning signals to each scanning signal line G (j) according to vertical synchronizing signal Vs output from a control unit 17 and horizontal synchronizing signal Hs based on a first gate clock signals GCK1 and a second gate clock signals GCK2. The first gate clock signals GCK1 and the second gate clock signals GCK2 are rectangular signals having an opposite phase to each other.

Figure 7:
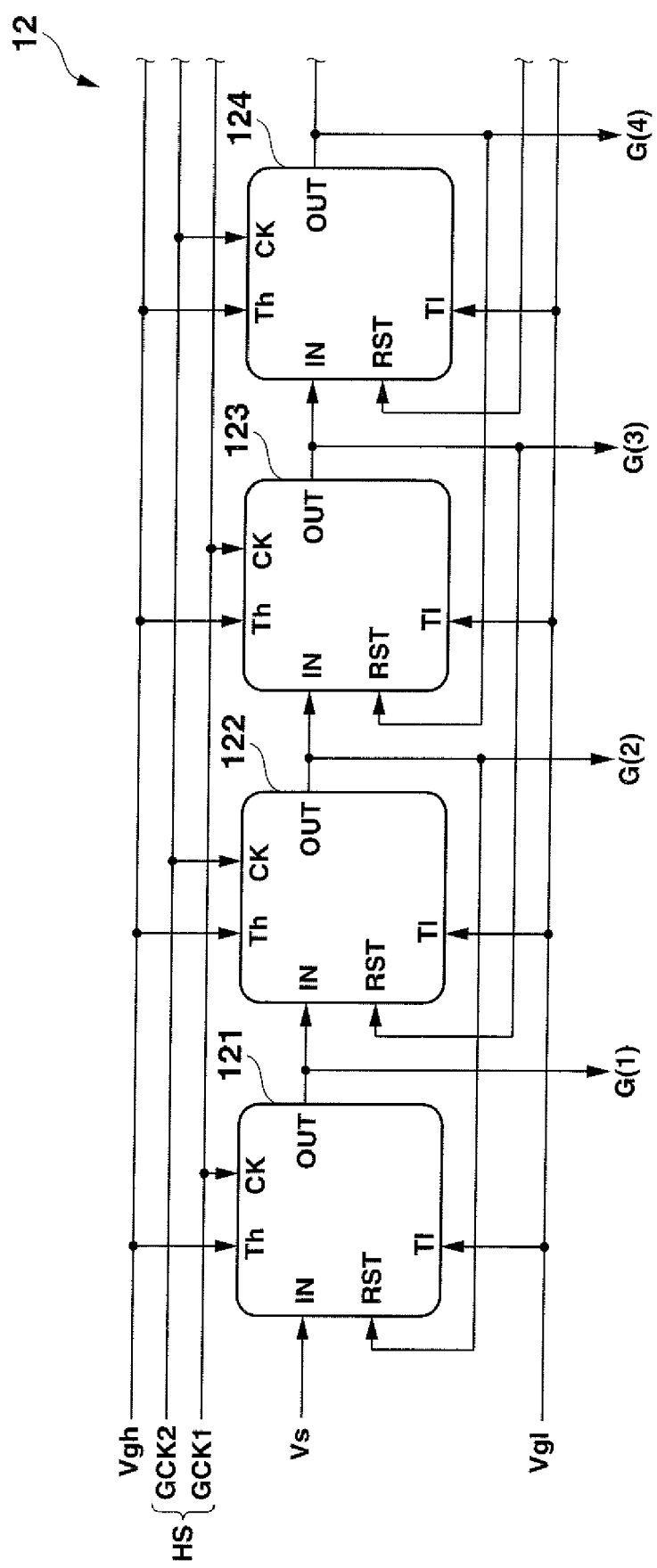
FIG. 7 is a block diagram illustrating a configuration of a scanning signal line drive circuit.

As shown in FIG. 7, the main part of the scanning signal line drive circuit 12 is roughly configured with holding circuits 121, 122, 123, 124, . . . connected in series of the number equivalent to the number of the scanning signal lines ("n" stages). Each holding circuit 121, etc. comprises: an input terminal IN, an output terminal OUT, a reset terminal RST, a clock signal input terminal CK, a high potential power input terminal Th, and a low potential power input terminal Tl. The vertical synchronizing signal Vs is supplied to the input terminal IN of the holding circuit 121 as the first stage input signal. The output signals from the holding circuit in the previous stage are supplied to the input terminal IN of the holding circuit in the second and subsequent stages. The output signals from the holding circuit in the next stage are supplied to the reset terminal RST of each holding circuit. Here, separate reset signals END or the output signals from the holding circuit 121 in the first stage may be supplied to the reset terminal RST of the holding circuit in the final stage (not shown, "y"th stage, for example).

Furthermore, the first gate clock signal GCK1 is supplied to clock signal input terminals CK of the holding circuit in the odd-numbered stages. The second gate clock signal GCK2 having opposite phase to the first gate clock signal GCK1 is supplied to the clock signal input terminals CK of the holding circuit in the even-numbered stages. A predetermined high voltage Vgh is supplied to the high-potential power input terminal Th of each holding circuits, whereas a predetermined low voltage Vgl is supplied to the low-potential power input terminal Tl of each holding circuits.

Figure 8:
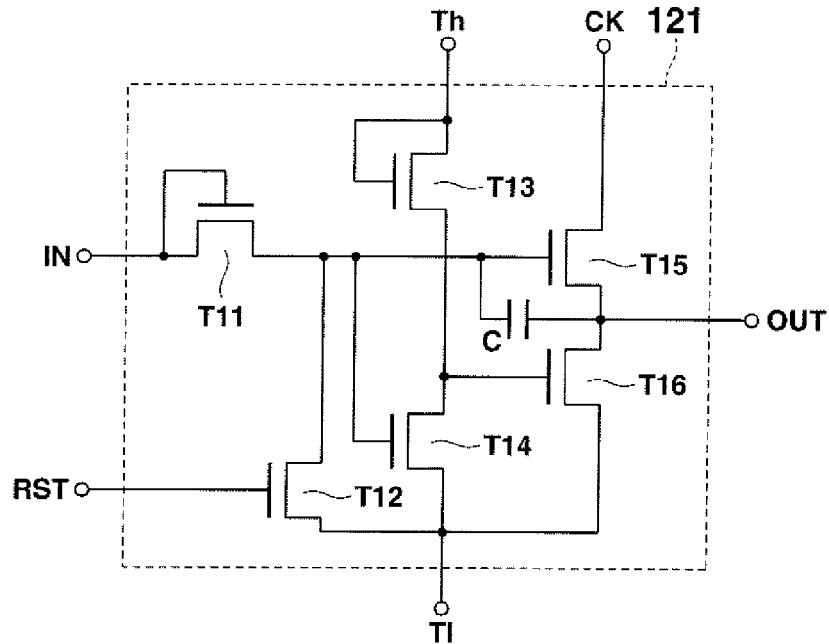
FIG. 8 is a block diagram illustrating a configuration of a holding circuit.

As shown in FIG. 8, each holding circuit 121, 122, 123, 124, . . . is provided with six MOS type Field Effect Transistors (hereinafter referred to as MOS transistors) T11 to T16 and a capacitance C.

As shown in FIG. 6, such scanning signal line drive circuit 12 starts scanning in the relevant frame in response to the vertical synchronizing signal Vs, and performs voltage output, which is based on the first gate clock signals GCK1 and the second gate clock signals GCK2, from a low-level voltage Vgl to a high-level voltage Vgh for a specified period of time starting from the scanning signal line in each of the first stage G (1) up to final stage G (n).

Specifically, the scanning signal line drive circuit 12 sequentially sets TFT1 (i, j) and TFT2 (i, j) corresponding to the relevant scanning signal line G (j) to ON, and writes the display signal voltage that is output to the data signal line S (i) at that time to the first sub-pixel P1 (i, j) and the second sub-pixel P2 (i, j).

The data signal line drive circuit 13 outputs display signal voltage corresponding to each data signal line S (i) disposed on the display panel 11 at predetermined timing according to the horizontal synchronizing signal Hs, the vertical synchronizing signal Vs, the image data Data, a reference clock signal CLK, and a polarity reversal signal Pol among of which output from the control unit 17.

Figure 9:
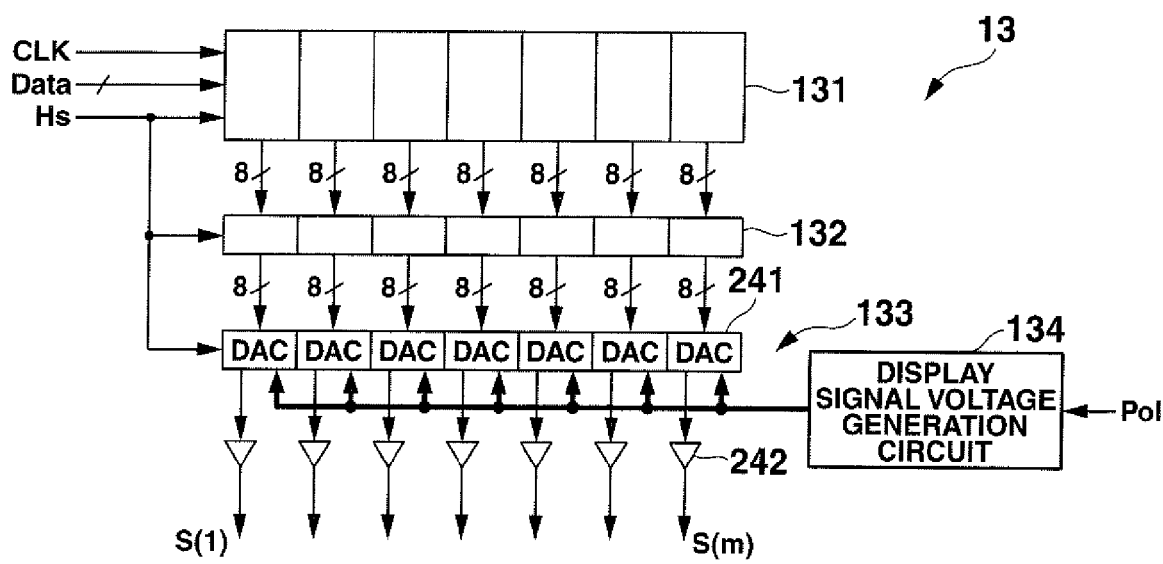
FIG. 9 is a block diagram illustrating a configuration of a data signal line drive circuit.

As shown in FIG. 9, the functional block of the data signal line drive circuit 13 comprises sampling memories 131, data latch units 132, D/A conversion circuits (DAC) 133, and a display signal voltage generation circuit 134.

The sampling memories 131 have data storage areas as many as the number of data signal lines S (i). In synchronization with the horizontal synchronizing signal Hs output from the control unit 17 and the reference clock signal CLK, the sampling memory 131 fetches image data corresponding to each pixel from the image memory 10 sequentially, starting from the data corresponding to the scanning signal line in the previous stage, in units of image data corresponding to the pixel for one scanning signal line (image data for one horizontal period). Specifically, each sampling memory 131 fetches image data corresponding to the relevant scanning signal line, and stores each of the image data fetched in the data storage area corresponding to the relevant scanning signal line S (i). In this case, the image data includes gradation levels to be displayed in each pixel. This gradation levels are displayed by each pixel as 8-bit digital data, for example. This 8-bit digital data is stored in each data storage area.

The image data of one horizontal period fetched by the sampling memory 131 is transferred from the sampling memory 131 to the data latch unit 132 in response to a request from the data latch unit 132 in the subsequent stage. After a completion of transferring the image data to the data latch unit 132, the sampling memory 131 starts to fetch the image data corresponding to the scanning signal line of the next row for the next horizontal period. This is performed in synchronization with horizontal synchronizing signal Hs.

The data latch units 132 obtain image data for one horizontal period collectively from the sampling memories 131 according to horizontal synchronizing signal Hs, and output the obtained image data to the D/A conversion circuits 133 in the subsequent stage.

The D/A conversion circuit 133 comprises multiple DAC units 241 and output amplification circuits 242. The display signal voltage supplied from the display signal voltage generation circuit 134 is selected by the DAC units 241, which allows each image data output from the data latch units 132 to be converted into display signal voltages as corresponding analog signals, and then output to the data signal lines S (i) via the output amplification circuits 242.

At this time, the D/A conversion circuits 133 convert digital image data output from the data latch units 132 into an analog display signal voltage, in response to the polarity reversal signals Pol output from the control unit 17. Specifically, when the polarity reversal signal Pol is in high state Vsh, the D/A conversion circuits 133 perform D/A conversion to allow the image data output from the data latch units 132 to become display signal voltage having positive polarity. On the contrary, when the polarity reversal signal Pol is in low state Vsl, the D/A conversion circuits 133 perform D/A conversion to allow the image data output from the data latch units 132 to become display signal voltage having negative polarity. In other words, the D/A conversion circuits 133 perform D/A conversion to allow the voltage applied to the liquid crystal to have positive polarity when the polarity reversal signal Pol is in high state Vsh, and allow the voltage applied to the liquid crystal to have negative polarity when the polarity reversal signal Pol is in low state Vsl.

Figure 10:
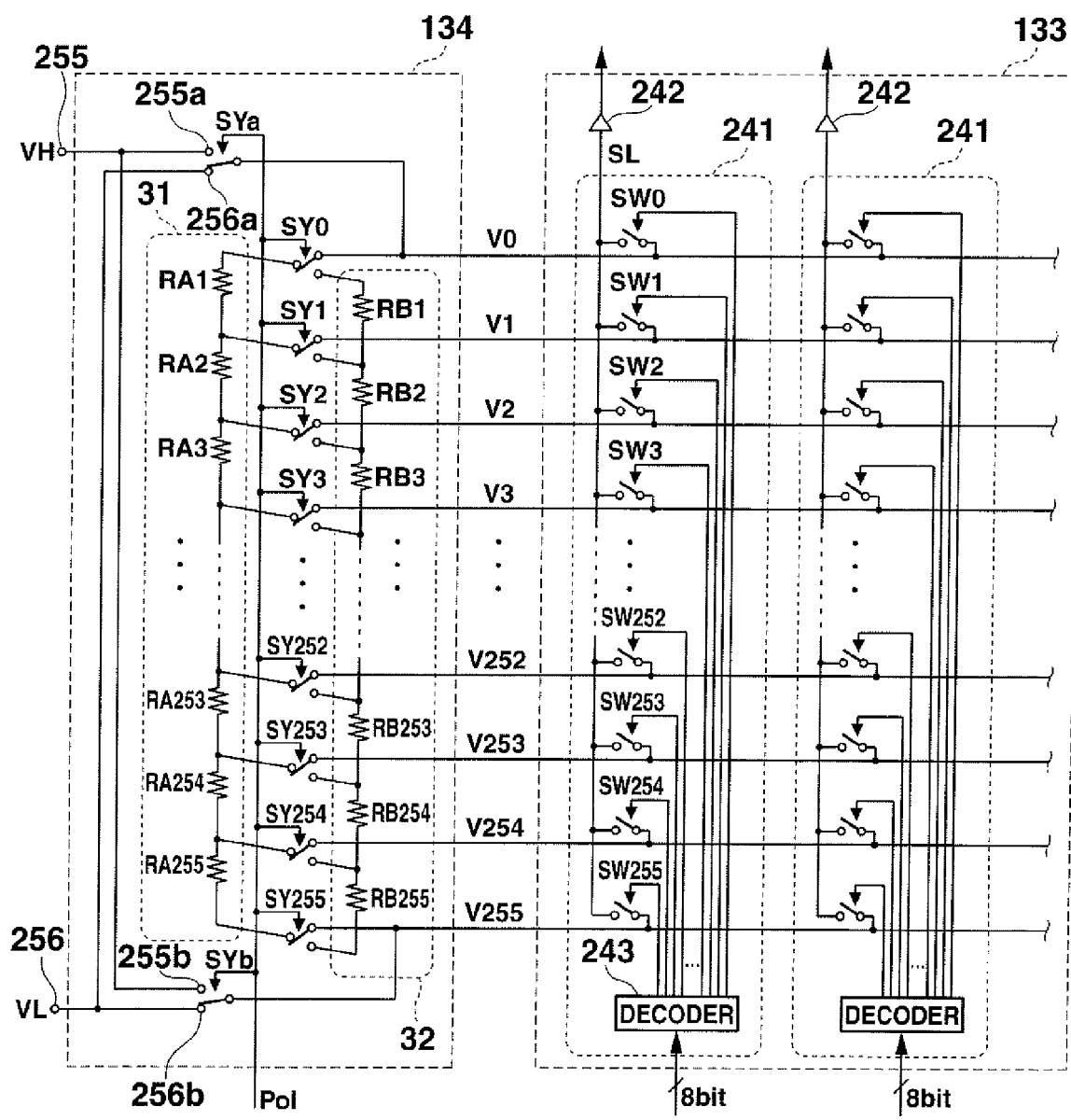
FIG. 10 is a block diagram illustrating a configuration of a display signal voltage generation circuit.

As shown in FIG. 10, the display signal voltage generation circuit 134 comprises: a pair of ladder resistors 31 and 32, multiple switches SY0, SY1, ..., SY255, and switches SYa and SYb etc. Each pair of ladder resistors 31 and 32 divides the voltage between terminal 255 (voltage VH) and terminal 256 (voltage VL) using multiple resistors suitable for the bit count p of the image data (8 bits in the embodiment of the present invention). The multiple switches SY0, SY1, ..., SY255 serves for selecting a desired ladder resistor of the pair. The switches SYa and SYb serve for switching the polarity of the voltage to be applied to the ladder resistors in response to the ladder resistor selected. The display signal voltage generation circuit 134 selects desired ladder resistors by the operation of each switch SY0, SY1, ..., SY255 based on the polarity reversal signal Pol output from the control unit 17. At the same time, the display signal voltage generation circuit 134 switches the polarity of the voltage to be applied to the ladder resistors by the operation of the switches SYa and SYb, and applies each voltage divided by the ladder resistors to the voltage application lines V0, V1, ..., V255 as display signal voltage at a corresponding gradation level.

Specifically, when the polarity reversal signal Pol from the control unit 17 is at high level Vsh, the ladder resistor 31 is selected by the operation of each switch SY0, SY1, ..., SY255. In addition, when the terminal 255a (voltage VH) and the terminal 256b (voltage VL) are selected by the operation of the switches SYa and SYb, the voltage between the terminals 255a (voltage VH) and 256b (voltage VL) is divided by multiple resistors RA1, RA2, ..., RA254 suitable for the bit count of the image data (8 bits in the embodiment of the present invention). Each voltage is applied to the voltage application lines V0, V1, ..., V255 as display signal voltage that allows a voltage having positive polarity to be applied to the liquid crystal, for example.

When the polarity reversal signal Pol from the control unit 17 is at low level Vsl, the ladder resistor 32 is selected by the operation of each switch SY0, SY1, ..., SY255. In addition, when the terminals 256a (voltage VL) and 255b (voltage VH) are selected by the operation of the switches SYa and SYb, the voltage between the terminals 256a (voltage VL) and the terminal 255b (voltage VH) is divided by multiple resistors RB1, RB2, ..., RB254 suitable for the bit count of the image data (8 bits in the embodiment of the present invention), and each voltage is applied to voltage application lines V0, V1, ..., V255 as display signal voltage that allows a voltage having negative polarity to be applied to the liquid crystal, for example.

Each DAC unit 241 comprises: a decoder 243 and, selector switches SW0, SW1, ..., SW255 which are connected to voltage application lines V0, V1, ..., V255. In the decoder 243, the image data output from the data latch units 152 are input and decoded, and data signals that satisfy the number of gradation levels (i.e. bit count) are output. Each selector switch SW0, SW1, ..., SW255 is set to ON/OFF according to the data signals output from the decoder 243. The selected voltage application lines V0, V1, ..., V255 and a voltage output line SL are connected, and the display signal voltage which is applied to the selected voltage application lines V0, V1, ..., V255 is supplied to the voltage output line SL. The display signal voltage applied to the voltage output line SL is then supplied to the data signal lines S (i) via the output amplification circuit 242.

The common voltage generation circuit 14 applies identical common voltage Vc to the common electrode 115 and each auxiliary capacitance line C1 (j) and C2 (j). Common voltage Vc can be direct voltage, for example.

Figure 11:
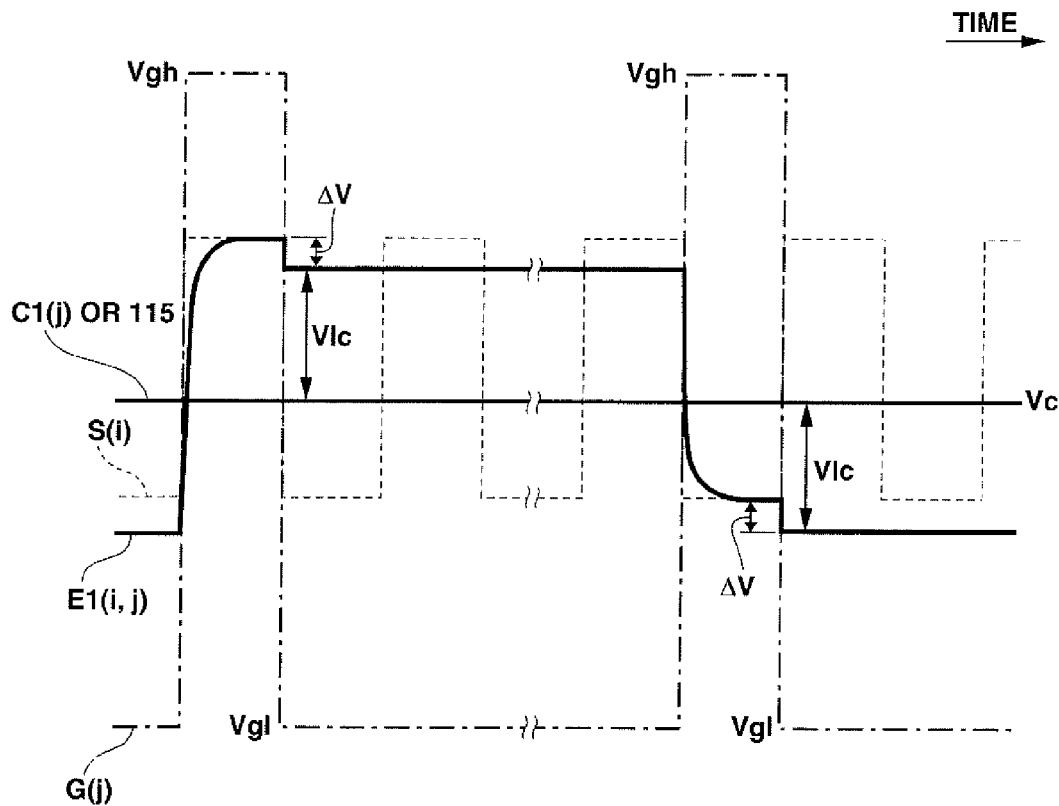
FIG. 11 is a drawing illustrating a voltage to be applied to the liquid crystal at a first sub-pixel.

The control unit 17 outputs the polarity reversal signal Pol to allow the voltage to be applied to the liquid crystal to have opposite polarities between the pixels corresponding to adjacent scanning signal lines, namely, between the adjacent pixels in the pixel row direction. Thus, the voltage Vlc1 as shown in FIG. 11 is applied to the liquid crystal in the first sub-pixel P1 (i, j) of each pixel P (i, j) over an approximately entire period in one flame. In FIG. 11, ΔV shows a pull-in voltage that is generated when write of display signal voltage into a pixel is completed due to the effect of parasitic capacitance between scanning signal lines and pixel electrodes. It is desirable that a center of amplitude of the common voltage Vc is set to a value shifting the center of amplitude of the display signal voltage by ΔV in the direction of generation of ΔV.

The step-up voltage generation circuit 15 applies a step-up voltage Vd to the step-up capacitance lines D (j) based on the polarity reversal signal Pol output from the control unit 17 and the inherent information Inf stored in the inherent information storage unit 16. A step-up voltage Vd may be a rectangular alternate voltage of the pre-determined frequency. The step-up voltage Vd may be generated according to the polarity reversal signal Pol output from the control unit 17.

Specifically, the step-up voltage generation circuit 15 applies step-up voltage Vdl, as shown in FIG. 6, as the voltage on the negative side with respect to the common voltage Vc when the polarity reversal signal Pol is high level Vsh, and step-up voltage Vdh as the voltage on the positive side with respect to the common voltage Vc when the polarity reversal signal Pol is low level Vsl. That is, the step-up voltage generation circuit 15 applies step-up voltage Vd to the step-up capacitance line D (j) with the rectangular alternate current signal synchronizing to the polarity reversal signal Pol so that its common voltage Vc becomes center voltage.

Figure 12:
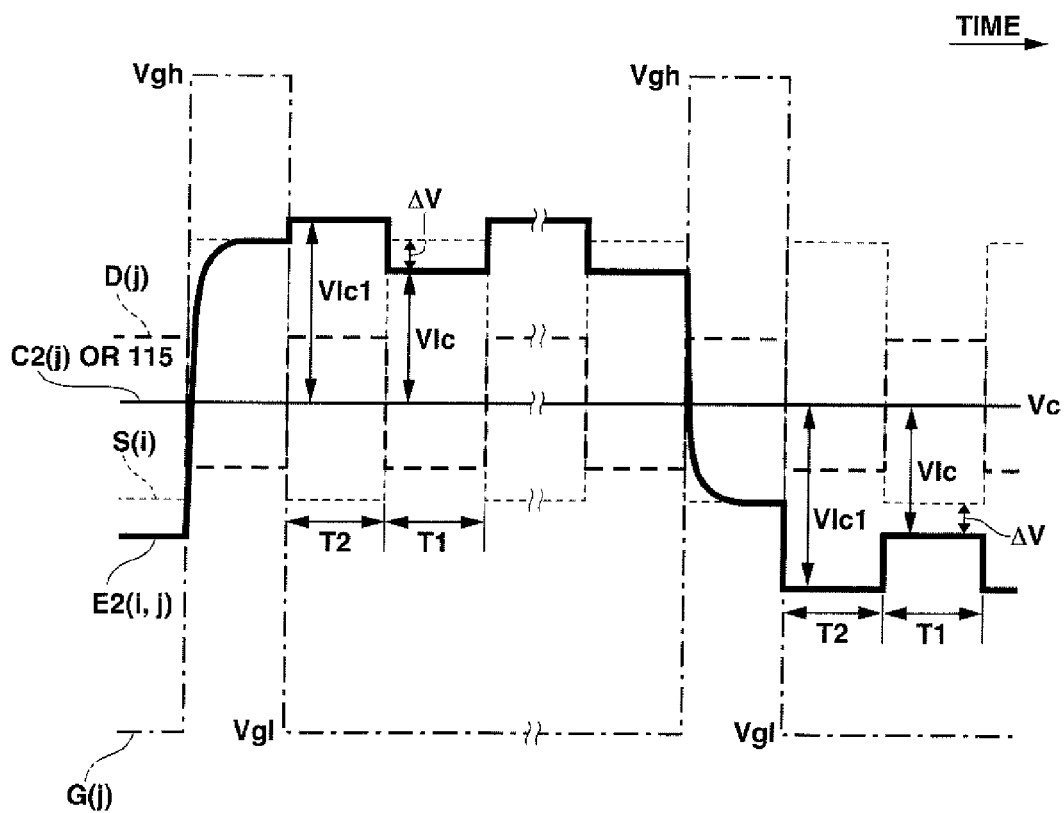
FIG. 12 is a drawing illustrating a voltage to be applied to the liquid crystal at a second sub-pixel.

FIG. 12 illustrates the voltage applied to a liquid crystal in the second sub-pixel P2 (i,j). During the period T2, the above-mentioned polarity of the voltage applied to the step-up capacitance line D (j) is equal to the polarity of a display signal voltage written in said pixel. In this period T2, the voltage applied to a liquid crystal in the second sub-pixel P2 (i,j) becomes the applied voltage Vcl1 higher than the voltage Vc1 applied to a liquid crystal in the first sub-pixel P1 (i,j). On the other hand, during the period T1, in which the above-mentioned polarity of the voltage applied to the step-up capacitance line D (j) differs from the polarity of a display signal voltage written in said pixel, the voltage applied to a liquid crystal in the second sub-pixel P2 (i,j) becomes the applied voltage Vc1, equal to the voltage applied to a liquid crystal in the first sub-pixel P1 (i,j).

Thus, in each frame, the effective voltage applied to a liquid crystal of the second sub-pixel P2 (i,j) can be made higher than the effective voltage applied to a liquid crystal of the first sub-pixel P1 (i,j) by about |Vlc1−Vlc|/2.

Figure 13:
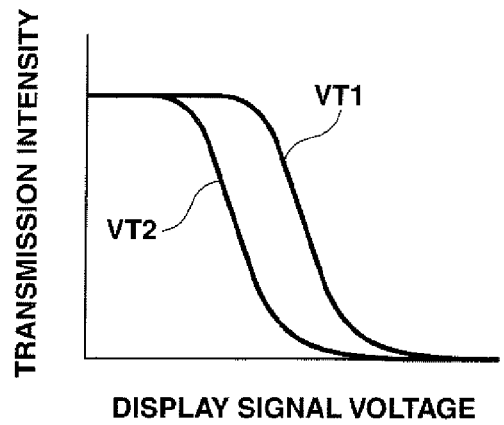
FIG. 13 is a drawing illustrating the relationship between display signal voltage and transmission intensity between sub-pixels in each pixel.

According to the present embodiment, the relationship VT2 between the display signal voltage and transmission intensity in the second sub-pixel P2 (i,j) can be shifted as shown in FIG. 13 with regard to the relationship VT1 between the display signal voltage and transmission intensity in the first sub-pixel P1 (i,j), allowing to obtain the relationship between multiple display signal voltages and transmission intensity in each pixel (i,j), and to improve the viewing-angle dependence in the liquid crystal display device 1.

Figure 14A:
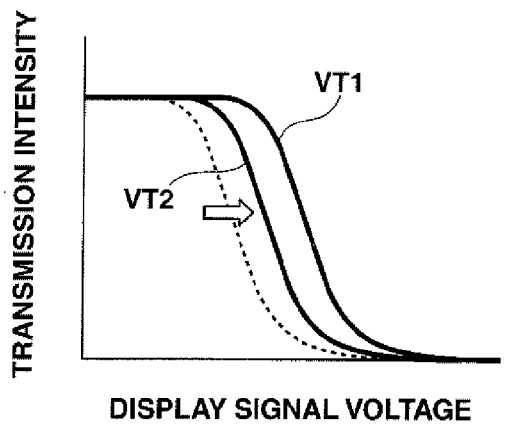
FIG. 14A is a drawing illustrating the change of relationship between display signal voltage and transmission intensity between sub-pixels in each pixel, with the step-up voltage of small oscillation amplitude.
Figure 14B:
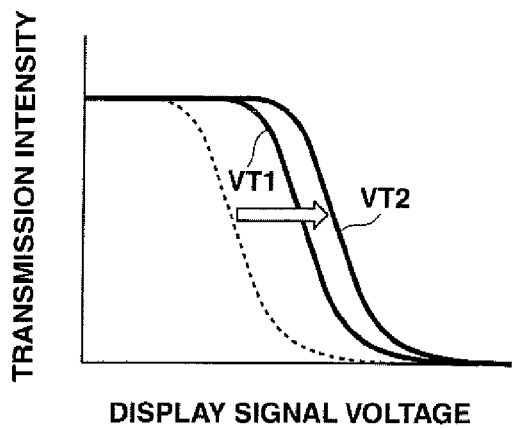
FIG. 14B is a drawing illustrating the change of relationship between display signal voltage and transmission intensity between sub-pixels in each pixel, with the inversed phase of step-up voltage.

In the meantime, as shown in FIG. 14A, when the relationship VT2 between the display signal voltage and transmission intensity in the second sub-pixel P1 (i,j) is made approaching closer to the relationship VT1 between the display signal voltage and transmission intensity in the first sub-pixel P1 (i,j), the amplitude width of the step-up voltage Vd may be controlled to be smaller with its center voltage coinciding to common voltage Vc. When the step-up voltage Vd is made direct voltage equal to common voltage Vc, VT1 and VT2 can be made equal. Furthermore, by making the amplitude of the step-up voltage Vd a reverse phase from the beginning, and by controlling its amplitude width to be larger, as shown in FIG. 14B, the effective voltage in the second sub-pixel P2 (i,j) can be made lower than the effective voltage in the first sub-pixel P1 (i,j).

Thus, according to the present embodiment, since the relationship between the display signal voltage and transmission intensity can be shifted easily by adjusting the step-up voltage Vd applied to the step-up capacitance lines D (j), the viewing-angle dependence can be improved by simple circuit configuration. Furthermore, the degree of viewing-angle dependence of it can be adjusted.

For example, after a display panel 11 has been manufactured, differences of viewing-angle dependence among a plural display panels 11 can be minimized by followings configurations. The inherent information storage unit 16 is made to store the value of step-up voltage Vd which can be controlled to the similar extent as the control of viewing-angle dependence of other display panels 11 as the inherent information Inf, and a step-up voltage generation circuit 15 is configured to apply step-up voltage Vd having an amplitude based on the inherent information Inf stored in the relevant inherent information storage unit 16 to the step-up capacitance line D (j).

In addition, since the step-up voltage generation circuit 15 needs to adjust the amplitude of step-up voltage Vd only, a simple step-up voltage generation circuit 15 can be configured. If sub-pixels have different data signal lines, and different display signal voltages are applied to each sub-pixel via corresponding data signal lines and TFTs, for example, multiple display signal voltage generation circuits relatively large in size are required to apply different display signal voltages to each sub-pixel as described above. However, according to the embodiment of the present invention, it does not need complex configuration, and the viewing-angle dependence can be adjusted with a simpler circuit configuration compared with configuration mentioned above.

Moreover, since the common electrode 115 need not be separated for each region within a pixel, the number of manufacturing processes does not increase. In addition, since display signal voltage is applied directly to the pixel electrodes of each sub-pixel via corresponding TFTs in the present embodiment, the voltage is applied to the liquid crystal more stably compared with the one in which voltage is applied to the pixel electrodes only via capacitances.

Meanwhile, an EEPROM (Electrically Erasable Programmable Read Only Memory), which is one of nonvolatile memories, can be used for an inherent information storage unit 16. The EEPROM has the state that no information has been written in it i.e. "white" state at the start of manufacturing of a display device 1. After the completion of manufacturing of liquid crystal display device 1, predetermined information can be stored in the inherent information storage unit 16 by connecting a system device for writing in an EEPROM to a signal terminal for writing 161 in accordance with the finishing state of the relevant liquid crystal display device 1.

It is preferable to set the writing voltage Vpp into the inherent information storage unit 16 at a level higher than the reference supply voltage Vcc to be input to the power control circuit for the relevant liquid crystal display device 1 so that the information stored in the inherent information storage unit 16 can be prevented to be erased carelessly by the influence of the reference supply voltage Vcc.

The above embodiment explains a case that the common voltage generating circuit 14 applies direct voltage to the common electrode 115 and each of the auxiliary capacitance lines C1 (j) and C2 (j) as equal common voltage Vc, but the common voltage Vc may be a rectangular alternate signal oscillating synchronously with the step-up voltage Vd. In this case, the amplitude center voltages of the common voltage Vc and of the step-up voltage Vd are preferably set to be at an equal voltage level. Furthermore, it is preferable to set this amplitude center voltage to the voltage shifted by ΔV in the generation direction of said ΔV to the amplitude center voltage of the display signal voltage. In this case, the common voltage Vc and of the step-up voltage Vd are preferably in the same phase, and the amplitude of the common voltage Vc is preferably set to be smaller than that of the step-up voltage Vd. Thereby, the state can be maintained in which the effective voltage applied to a liquid crystal in the second sub-pixel P2 (i,j) is higher than the effective voltage applied to a liquid crystal in the first sub-pixel P1 (i,j).

The above embodiment explains a case that the shape and the area of the first pixel electrodes E1 (i, j) in the first sub-pixels P1 (i, j) are the same as those of the second pixel electrodes E2 (i, j) of the second sub-pixels P2 (i, j). Hereinafter, a typical modification of the first sub-pixels P1 (i, j) in a pixel P (i,j) and the layout of the first sub-pixels P1 (i, j) will be described.

Figure 15:
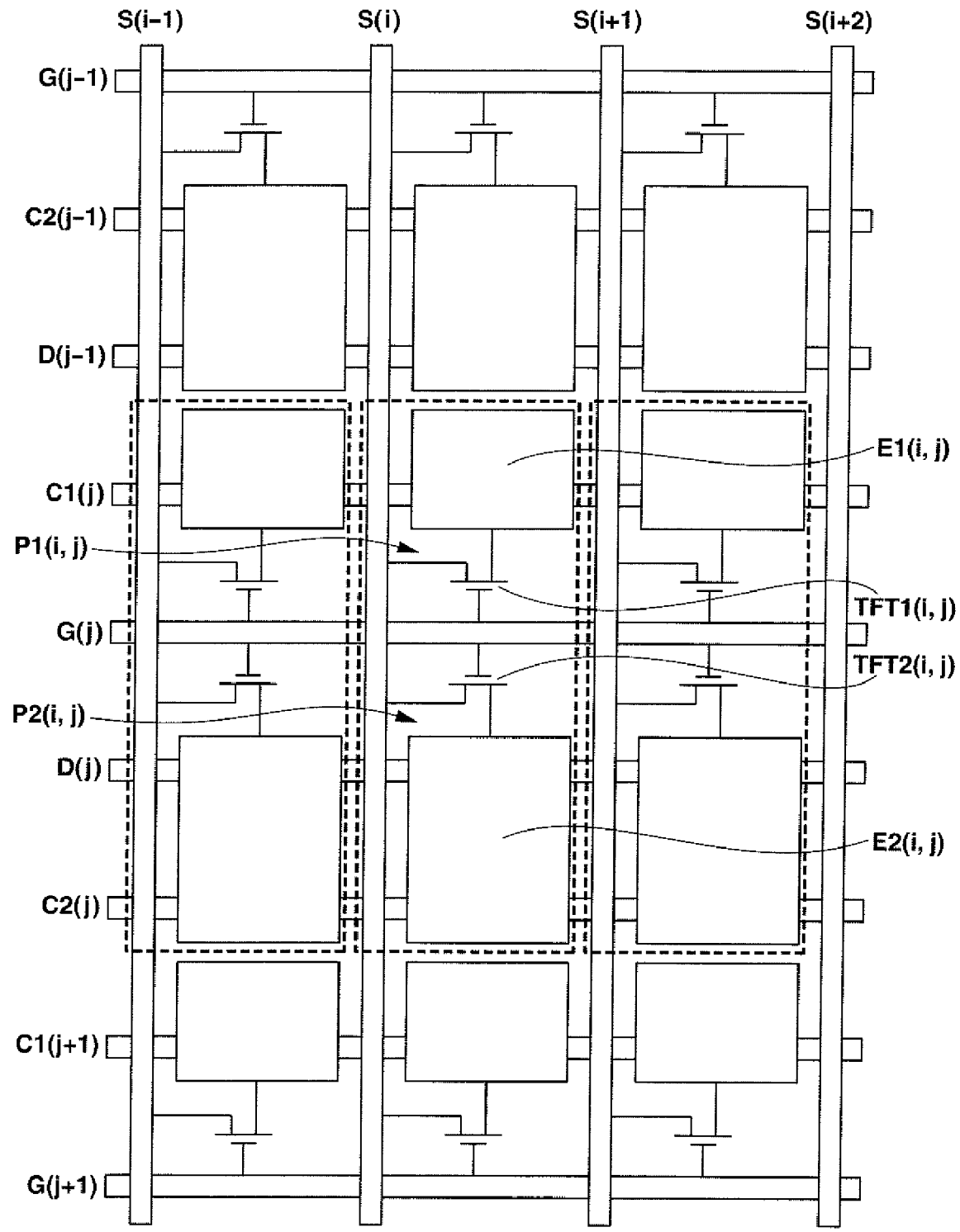
FIG. 15 is a partially magnified plan view illustrating a first example of the layout of first and second sub-pixels in a pixel.

FIG. 15 is a partially magnified plan view showing the first example of the layout of first and second sub-pixels in pixels P (i, j), P1 (i, j) and P2 (i, j), respectively. As shown in FIG. 15, a shape and an area of a first pixel electrode E1 (i, j) and a second pixel electrode E2 (i, j) may differ. In this case, however, the size and shape of each of the first sub-pixels P1 (i, j) are identical, and the size and shape of each of the second sub-pixels P2 (i, j) are also identical. Consequently, two sub-pixels, the first sub-pixel P1 (i, j) disposed on the side of the previous row of the scanning line G (j), namely on the side of the j−1 row, and the second sub-pixel P2 (i, j) disposed on the side of the following row of the scanning line G (j), namely on the side of the j+1 row, constitute a pixel pattern. This pixel pattern is disposed on all of the intersections between each row and column.

The region enclosed in the broken line represents pixels for one row and three columns. The first sub-pixels P1 (i, j) are disposed on the upper side of the scanning line G (j) via the first switching devices TFT1 (i, j). The second sub-pixels P2 (i, j) are disposed on the lower side of the scanning line G (j) via the second switching devices TFT2 (i, j).

In FIG. 15, each of the first sub-pixels P1 (i, j) is disposed adjacent to the second sub-pixels P2 (i, j), which are disposed on the lower side of the scanning line G (j−1) of the pixels P (i, j) in the previous row. Each of the second sub-pixels P2 (i, j) is disposed adjacent to the first sub-pixels P1 (i, j), which are disposed on the upper side of the scanning line G (j+1) of the pixels P (i, j) in the following row, namely on the upper side of the scanning line G (j+1) of the following row.

The auxiliary capacitance line C1 (j) for the first pixel P1 (i, j) is disposed on the upper side of the scanning line G (j) in parallel to the scanning line G (j).

The auxiliary capacitance line C2 (j) for the second sub-pixel P2 (i,j) is disposed on the lower side of the scanning line G (j) in parallel to the scanning line G (j). The step-up capacitance line D (j) of the second sub-pixel P2 (i, j) is disposed on the upper side of the auxiliary capacitance line C2 (j) in parallel to the scanning line C2 (j).

The above embodiment is a case that the step-up capacitance line D (j) is disposed on the upper side of the auxiliary capacitance line C2 (j) in the second sub-pixels P2 (i, j) closer to the scanning signal line G (j). Unlike the embodiment in FIG. 15, the auxiliary capacitance line C2 (j) may be disposed on the upper side of the step-up capacitance line D (j) closer to the scanning line signal G (j).

The above embodiment is a case that the layout of the first sub-pixels P1 (i, j) and the second sub-pixels P2 (i, j) is identical between the pixels adjacent to each other in the direction of the length of the scanning signal lines G (j) and step-up capacitance lines D (j). However, as shown in FIGS. 16 and 17 later, the layout of the first sub-pixels P1 (i, j) and the second sub-pixels P2 (i, j) may be reversed between the pixels adjacent to each other in the direction of the length of the scanning signal lines G (j) and step-up capacitance lines D (j).

Figure 16:
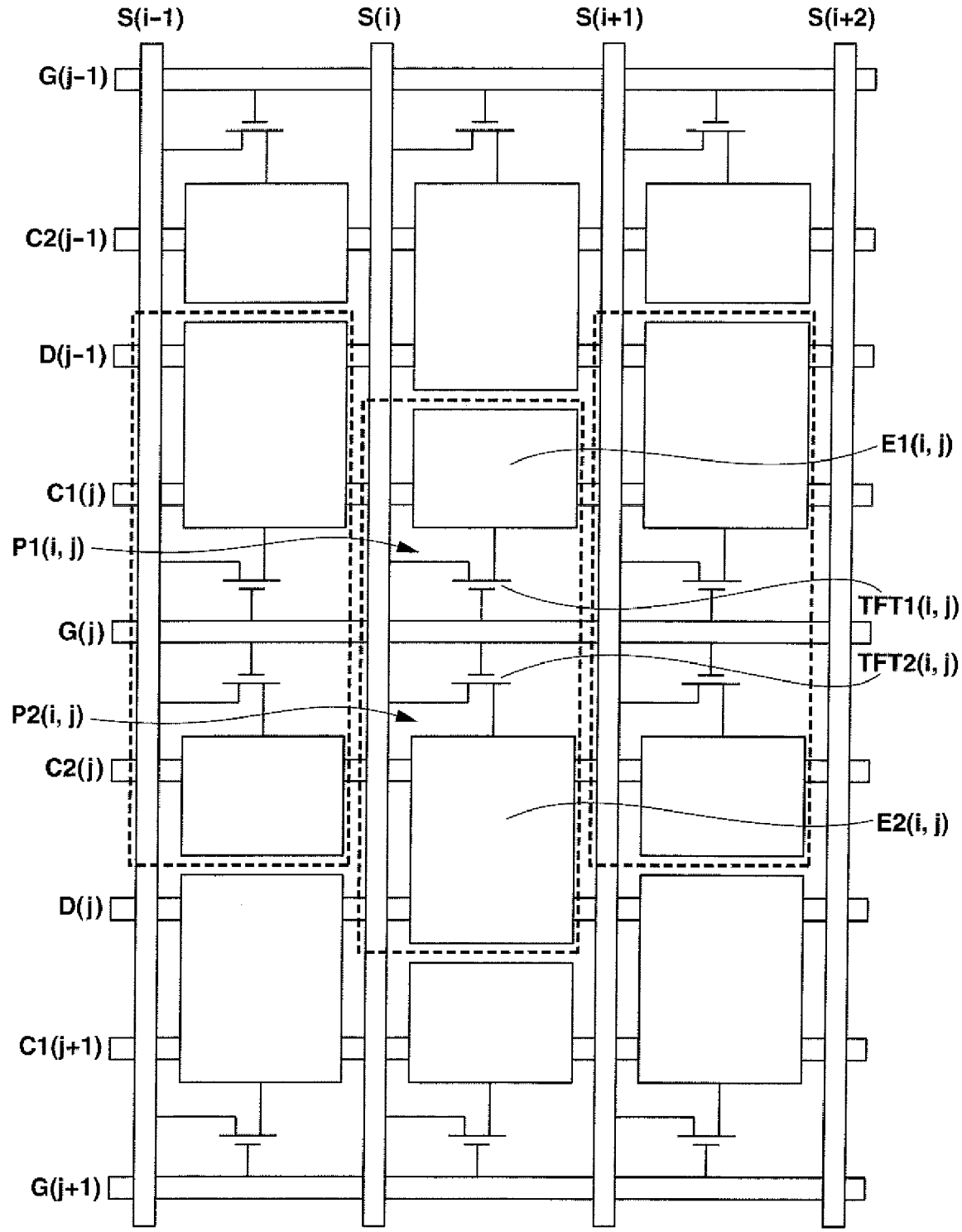
FIG. 16 is a partially magnified plan view illustrating a second example of the layout of first and second sub-pixels in a pixel.
Figure 17:
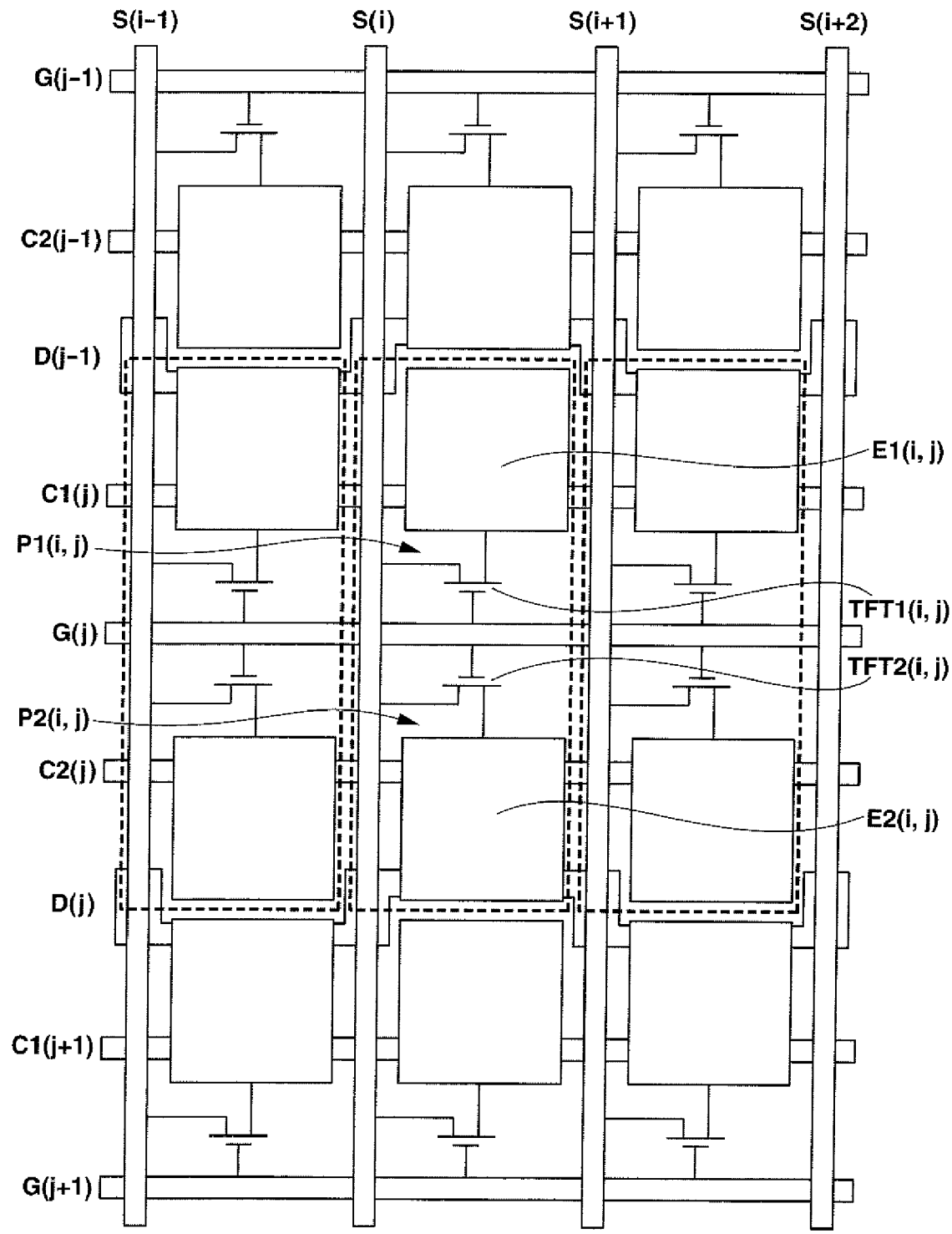
FIG. 17 is a partially magnified plan view illustrating a third example of the layout of first and second sub-pixels in a pixel.

FIG. 16 is a partially magnified plan view showing the second example of the layout of first and second sub-pixels P1 (i, j) and P2 (i, j), respectively, in pixels P (i, j).

As shown in FIG. 16, a pixel P (i, j) comprises a first sub-pixel P1 (i, j), which has smaller area, and a second sub-pixel P2 (i, j), which has larger area. The layout of the pixels in the same column as the pixel display P (i, j), the layout of P (i, j−1) and P (i, j+1) for example, is identical to that of the pixel P (i, j). Meanwhile, the layout of the pixels in the same row as the pixel display P (i, j), the layout of P (i−1, j) and P (i+1, j) for example, is reversed from that of the pixel P (i, j). Specifically, in P (i−1, j) and P (i+1, j), the second sub-pixels P2 (i−1, j) are disposed on the upper side of the scanning line G (j) via the second switching device TFT2 (i−1, j), while the first sub-pixels P1 (i−1, j) disposed on the lower side of the scanning line G (j) via the first switching device TFT1 (i−1, j).

The auxiliary capacitance line C1 (j) for the first sub-pixel P1 (i,j) and the auxiliary capacitance line C2 (j) for the second sub-pixels P2 (i−1, j) and P2 (i+1, j), which are disposed on other columns that are adjacent to row j, are formed to be a common line, and this common line is arranged in parallel to the scanning line G (j).

The auxiliary capacitance line C2 (j) for the second sub-pixel P2 (i, j) and the auxiliary capacitance lines C1 (j) for the first sub-pixels P1 (i-1, j) and P1 (i+1, j) disposed on other columns that are adjacent to row j are formed to be a common line, and this common line is arranged in parallel to the scanning line G (j).

The step-up capacitance line D (j) for the second sub-pixel P2 (i, j) and the step-up capacitance lines D (j) for the second sub-pixel P2 (i−1, j) and P2 (i+1, j) disposed on other columns that are adjacent to row j are formed to be a common line, and this common line is arranged in parallel to the scanning line G (j).

FIG. 17 is a partially magnified plan view showing the third example of the layout of first and second sub-pixels P1 (i, j) and P2 (i, j), respectively, in pixels P (i, j).

As shown in FIG. 17, the pixel layout is the same as that shown in FIG. 16, except that an area of the first sub-pixels P1 (i, j) and that of the second sub-pixels P2 (i, j) are approximately equal, and that the interconnection wiring of the step-up capacitance line D (j) is different in the second sub-pixel P2 (i, j).

The step-up capacitance line D (j) for the second sub-pixel P2 (i, j) includes the step-up capacitance line D (j+1), which is in the columns at left and right (columns i−1 and i+1) and in the following row as well as the interconnection wiring portion for the following row of the scanning line G (j). In the figure, the interconnection wiring portion is in the shape of a staggered clamp. Consequently, the step-up capacitance line D (j) of the second sub-pixel P2 (i, j) extends along the second sub-pixel P2 (i, j) of the relevant row and the second sub-pixel P2 (i, j+1) of the following row alternately in the shape of polygonal line in the direction of the scanning line 21 and in the shape of waves by column.

The above embodiment is a case that two auxiliary capacitance lines are disposed for each pixel P (i, j). However, as shown in FIG. 18 later, an auxiliary capacitance line can be shared by the pre-determined sub-pixels.

Figure 18:
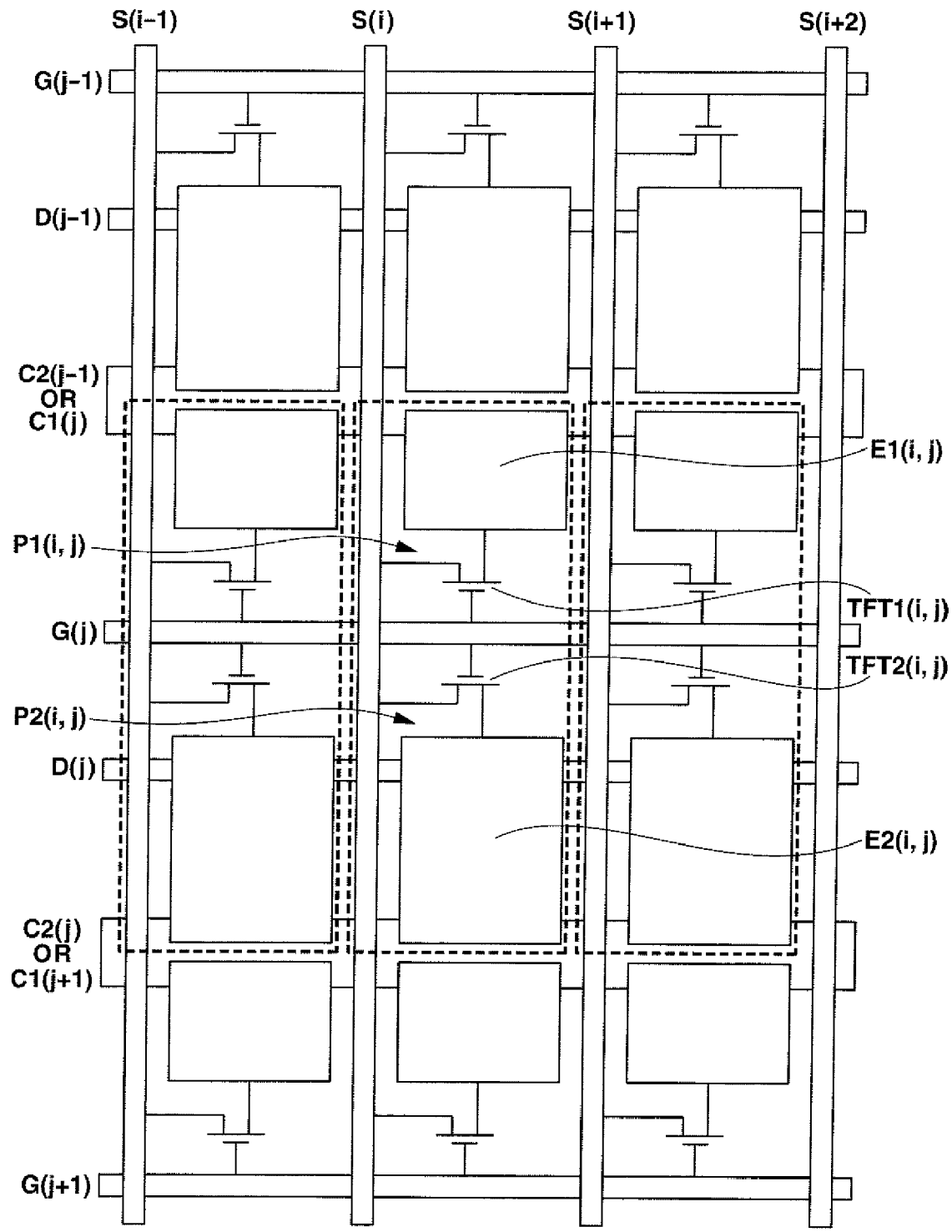
FIG. 18 is a partially magnified plan view illustrating a fourth example of the layout of first and second sub-pixels in a pixel.
Figure 19:
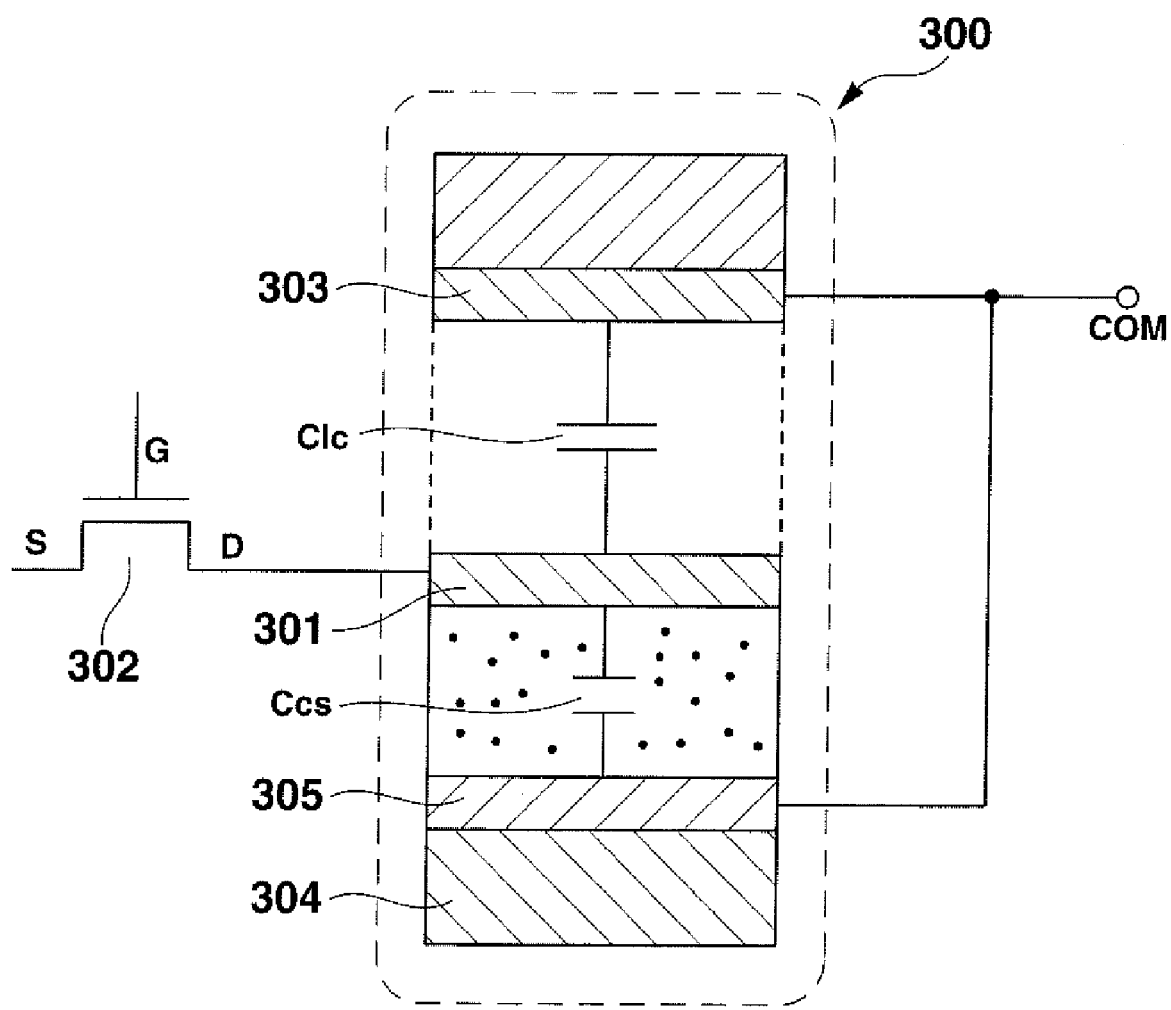
FIG. 19 is a drawing schematically illustrating a structure of a pixel of a conventional liquid crystal display device.

FIG. 18 is a partially magnified plan view showing the fourth example of the layout of first and second sub-pixels P1 (i, j) and P2 (i, j), respectively, in pixels P (i, j). The pixel 15 in FIG. 18 differs from the pixel 15 in FIG. 15 in that the auxiliary capacitance line C1 (j) for the first sub-pixel P1 (i, j) and the auxiliary capacitance line C2 (j−1) for the second sub-pixel P2 (i, j−1) disposed on the side of the scanning line G (j−1) of the previous row are formed to be a common line.

Similarly, the auxiliary capacitance line C2 (j) for the second sub-pixel P1 (i, j) disposed on the subsequent row of the scanning line G (j) and the auxiliary capacitance line C1 (j+1) for the first sub-pixel P1 (i, j+1) disposed on the side of the subsequent row of the scanning line G (j), namely scanning line G (j+1), are formed to be a common interconnection wiring, and this common interconnection wiring is disposed in parallel to the scanning line G (j).

The electrode and interconnection wiring structures described above simplifies mask patterns for fabrication of auxiliary capacitance lines C1 and C2, thus reducing cost.

According to the pixel layouts as shown in FIGS. 15 to 18, it is preferable that two regions having different relationships between display signal voltage and transmission intensity can be disposed so as to realize a higher uniformity.

The present invention allows the difference in viewing-angle dependence between liquid crystal panels to be corrected easily without increasing the number of manufacturing processes even after the manufacturing is completed.

What is claimed is:

1. A liquid crystal display device with multiple pixels provided therein, comprising:
    a first sub-pixel provided for each of said pixels and including,
    a first liquid crystal capacitance formed with a liquid crystal sandwiched between a common electrode and a first pixel electrode, and
    a first auxiliary capacitance formed with a solid dielectric material sandwiched between said first pixel electrode and a first auxiliary capacitance electrode;
    a second sub-pixel disposed adjacent to said first sub-pixel for each of said pixels and including,
    a second liquid crystal capacitance formed with a liquid crystal sandwiched between said common electrode and a second pixel electrode,
    a second auxiliary capacitance formed with a solid dielectric material sandwiched between said second pixel electrode and a second auxiliary capacitance electrode, and
    a step-up capacitance formed with a solid dielectric material sandwiched between said second pixel electrode and a step-up capacitance electrode;
    a first voltage application means for applying a common first voltage to said common electrode, said first auxiliary capacitance electrode, and said second auxiliary capacitance electrode; and
    a second voltage application means for applying a second voltage, which is different from said first voltage, to said step-up capacitance electrode,
    wherein said second voltage is a first rectangular AC voltage that oscillates at a specified frequency about a predetermined amplitude center voltage with a first amplitude.

2. The liquid crystal display device as set forth in claim 1, wherein said first voltage is a direct voltage whose voltage level is a specified value.

3. The liquid crystal display device as set forth in claim 2, wherein said first voltage is a direct voltage whose voltage level is equal to the predetermined amplitude center voltage of said first rectangular AC voltage oscillating with the specified amplitude.

4. The liquid crystal display device as set forth in claim 1, wherein said first voltage is a second rectangular AC voltage oscillating with a second amplitude that is smaller than the first amplitude of said first rectangular AC voltage.

5. The liquid crystal display device as set forth in claim 4, wherein the second rectangular AC voltage as said first voltage and the first rectangular AC voltage as said second voltage are in the same phase.

6. The liquid crystal display device as set forth in claim 1, wherein said first sub-pixel has a first switching device that is connected to said first pixel electrode, said second sub-pixel has a second switching device that is connected to said second pixel electrode, and said first and said second switching devices are connected to the same data signal lines and scanning signal lines,
    wherein a data signal line drive circuit is further provided to output a display signal voltage having AC voltage that oscillates at a specified frequency to said data signal line, and
    an interval of polarity reversal of said second voltage is synchronized with an interval of polarity reversal of said display signal voltage.

7. The liquid crystal display device as set forth in claim 6, wherein said step-up capacitance electrode is disposed on the same layer as said scanning signal lines.

8. The liquid crystal display device as set forth in claim 6, wherein said first pixel electrode and said second pixel electrode are disposed in different directions with respect to said scanning signal lines.

9. The liquid crystal display device as set forth in claim 6, wherein said first switching device and said second switching device are both thin-film transistors.

10. The liquid crystal display device as set forth in claim 1, wherein an area of said first pixel electrode is the same as an area of said second pixel electrode.

11. The liquid crystal display device as set forth in claim 1, wherein an area of said first pixel electrode differs from an area of said second pixel electrode.

12. The liquid crystal display device as set forth in claim 1, wherein said first auxiliary capacitance electrode, said second auxiliary capacitance electrode, and said step-up capacitance electrode are disposed on the same layer.

13. A liquid crystal display device with multiple pixels provided therein, comprising:
    a first sub-pixel provided for each of said pixels and including,
    a first pixel electrode disposed opposite to a common electrode via a liquid crystal layer, and a first auxiliary capacitance electrode disposed opposite to said first pixel electrode via an insulating layer;
    a second sub-pixel disposed adjacent to said first sub-pixel for each of said pixels and including, a second pixel electrode disposed opposite to said common electrode via a liquid crystal layer, and a second auxiliary capacitance electrode disposed opposite to said second pixel electrode via said insulating layer, and a step-up capacitance electrode;

a first voltage application means for applying a common first voltage to said common electrode, said first auxiliary capacitance electrode, and said second auxiliary capacitance electrode; and a second voltage application means for applying a second voltage, which is different from said first voltage, to said step-up capacitance electrode, wherein said second voltage is a first rectangular AC voltage that oscillates at a specified frequency about a predetermined amplitude center voltage with a first amplitude.

14. The liquid crystal display device as set forth in claim 13, wherein said first voltage is a direct voltage whose voltage level is a specified value.

15. The liquid crystal display device as set forth in claim 14, wherein said first voltage is a direct voltage whose voltage level is equal to the predetermined amplitude center voltage of said first rectangular AC voltage oscillating with the specified amplitude.

16. The liquid crystal display device as set forth in claim 13, wherein said first voltage is a second rectangular AC voltage oscillating with a second amplitude that is smaller than the first amplitude of said first rectangular AC voltage.

17. The liquid crystal display device as set forth in claim 16, wherein the second rectangular AC voltage as said first voltage and the first rectangular AC voltage as said second voltage are in the same phase.

18. The liquid crystal display device as set forth in claim 13, wherein said first sub-pixel has a first switching device that is connected to said first pixel electrode, said second sub-pixel has a second switching device that is connected to said second pixel electrode, and said first and said second switching devices are connected to the same data signal lines and scanning signal lines, wherein a data signal line drive circuit is further provided to output a display signal voltage having AC voltage that oscillates at specified frequency to said data signal line, and an interval of polarity reversal of said second voltage is synchronized with an interval of polarity reversal of said display signal voltage.

19. The liquid crystal display device as set forth in claim 18, wherein said step-up capacitance electrode is disposed on the same layer as said scanning signal lines.

20. The liquid crystal display device as set forth in claim 18, wherein said first pixel electrode and said second pixel electrode are disposed in different directions with respect to said scanning signal lines.

* * * * *